United States Patent Office 3,826,679
Patented July 30, 1974

3,826,679
METHOD FOR MAKING ELECTRON ENERGY SENSITIVE PHOSPHORS FOR MULTI-COLOR CATHODE RAY TUBES
Jack D. Kingsley and Jerome S. Prener, Schenectady, N.Y., assignors to General Electric Company
No Drawing. Application Sept. 27, 1971, Ser. No. 184,292, now Patent No. 3,767,459, which is a division of application Ser. No. 843,401, July 22, 1969, now Patent No. 3,664,862. Divided and this application Mar. 22, 1973, Ser. No. 343,637
Int. Cl. B44d 5/00; C09k 1/12
U.S. Cl. 117—100 B 4 Claims

ABSTRACT OF THE DISCLOSURE

A method for preparing europium activated yttrium oxide phosphor particles having a mon-luninescent core and a luminescent outer region including forming crystals of yttrium hydroxide having a thin outer region of europium-yttrium hydroxide and firing the crystals to produce the resultant particles.

---

This is a division of application Ser. No. 184,292, filed Sept. 27, 1971, now U.S. Pat. No. 3,767,459, which is a division of Ser. No. 843,401, filed July 22, 1969, now U.S. Pat. No. 3,664,862.

This invention relates to luminescent materials and more particularly, to methods for preparing phosphor particles containing both luminescent and non-luminescent regions arranged such that the efficiency with which the particles generate light when they are excited by a beam of electrons depends on the energy of those electrons in a controllable manner.

In nearly all present day color television tubes, the emission color is controlled by directing the exciting electrons to one of three physically separated phosphors having a distinct emission color. Because the physical dimensions of the regions having distinct emission colors must be very small in order to provide a picture which is acceptable for viewing, complex tube structures are required, such as the conventional "aperture mask" tube which has three electron guns and a metal plate having several hundred thousand microscopic holes therein. Because of this complexity, conventional cathode ray tubes are much more difficult and expensive to manufacture than tubes capable of emitting one color, or white, radiation which consist of only one electron gun and a simple homogeneous phosphor screen.

An alternate approach to controlling the emission color of a cathode ray tube is that of the "penetron" principle such as those described by Koller et al. in U.S. Pat. 2,590,-018, Cusano et al. in U.S. Pat. 2,958,002, and Kell in U.S. Pat. 3,275,466. In the classic embodiment of this principle, the phosphor screen consists of two or more uniformly thin phosphor layers, each having a distinct emission color. When such a tube is operated with a sufficiently small accelerating potential, the electrons have an energy sufficient to penetrate only that phosphor layer closest to the electron gun, so that the screen emits the color characteristics of that phosphor layer. At higher accelerating potentials, the average depth to which electrons penetrate into the layers, the "range," is greater. Consequently, those phosphor layers further from the electron gun are excited more strongly as the electron energy is increased and the emission color changes. Because the penetration depth of the electrons is not precisely defined, but rather excitation occurs from the surface inward, to a maximum penetration distance, the different phosphor layers cannot be excited with complete selectivity. The selectivity can be improved through the incorporation of tranparent, non-luminescent inert layers, such as those disclosed by Messineo et al. in U.S. Pat. 3,294,569.

In order to maximize the selectivity and color uniformity over the screen, the phosphor layers in a penetron type tube must be thin and extremely uniform in thickness. Such layers are difficult and expensive to make and tend to be optically inefficient.

To avoid the formation of the thin layers, Messineo et al. also proposes making multiple layered phosphor particles with each layer composed of a different phosphor material capable of emitting a different color.

A simpler and more practical approach is disclosed by Shortes in U.S. Pat. 3,408,223, wherein the phosphor particles are coated with a non-luminescent material such as silicon dioxide or tin oxide in order to reduce the response of the phosphor to low energy electrons. When these coated phosphor particles are mixed with other phosphor particles having an inert coating of a different thickness and a different emission color, one has a composite phosphor whose emission color depends on the energy of the exciting electrons.

In such a composite phosphor having two components, both components will emit radiation when excited with sufficiently high energy level electrons. In order that the emission color of the component having the thicker inert coating is dominant at the higher operating potential, it is necessary to reduce the fraction of the total phosphor volume which is occupied by the component having the thinner inert coating. As a censequence, the screen brightness at the lower operating potential is necessarily reduced.

This difficulty can be avoided in accord with the teachings of the instant invention by forming phosphor particles for one or more of the components with efficiencies for the generation of light which decreases above some electron energy as the electron energizing level increases. This can be achieved by having particles whose central regions, or cores, are non-luminescent.

It is therefore the object of this invention to provide a new and improved method for making multi-component electron energy sensitive phosphors in which each component phosphor has a distinct characteristic response to electron energy and a distinct emission color such that the emission color of the composite phosphor can be controlled by controlling the energy of the electrons used to excite the phosphor.

A further object of the invention is to provide a novel method for making phosphor particles having a non-luminescent interior region, or core, surrounded by a luminescent region such that the efficiency of the response of the phosphor decreases above some electron energy.

Another object of this invention is to provide a method for reducing or eliminating the response of the phosphor particles to electrons having energies less than some certain predetermined value by means of the formation of a non-luminescent region near the surface of the phosphor particles.

Still another object of the invention is to provide a method of making phosphor particles each having a non-luminescent core region and a non-luminescent surface region separated by a luminescent region, with all three regions having completely arbitrary and controllable dimensions, such that the electron beam energy at which the response is a maximum, can be predetermined.

Yet another object of this invention is to provide a method for making a simple homogeneous phosphor mixture which, when applied to the face plate of a cathode ray tube by conventional techniques and excited by electrons having selectively variable energies, is capable of displaying information or television pictures in a variety of colors.

Briefly, the present invention achieves these and other objects by means of a novel process in which suitable non-luminescent phosphor particles are first prepared, either by the inward solid state diffusion of the desired activating and coactivating impurities to the desired depth, leaving the region of the phosphor particles farthest from the surface non-luminescent, while the region occupied by activating and coactivating impurities becomes luminescent. Alternatively this configuration can be achieved by the growth of a luminescent region around a non-luminescent particle. A non-luminescent outer surface region can be made by the subsequent diffusion of a "killer" impurity which suppresses the luminescence of the region of the particle it occupies. Electrons having low energies are stopped entirely in the non-luminescent surface region while electrons having very high energies tend to penetrate into the non-luminescent central region, thus tending to lose their energy without producing appreciable luminescence. Those electrons having an initial energy such that they tend to lose the greatest fraction of their energy in the luminescent region produce luminescence with greatest efficiency.

The size or thickness of the non-luminescent and luminescent regions can be determined in a controlled manner through the selection of phosphor particles of the desired size, by controlling the parameters of the diffusion processes or by controlling the parameters of the layer growth process. In this way, the threshold potential and the accelerating potential at which the phosphor efficiency achieves its maximum value can be controlled. Thus, either the non-luminescent core or the non-luminescent outer layer may have dimensions equal to any fraction of the final phosphor particle radius ranging from zero to one.

In accordance with one embodiment of the invention, a composite phosphor is constructed by means of simple mechanical mixing of two or more phosphors having distinct emission colors and efficiency characteristics. For example, a cathode ray tube having a two-component phosphor constructed in accord with the instant invention when excited at a low operating voltage, $V_1$, emits color from only one component since the efficiency of the second component is exceedingly small at $V_1$. However, when the tube is excited at a higher operating voltage, $V_2$, the emission of the second component predominates since its efficiency is at a maximum and the first component luminesces with a reduced efficiency. Operation at voltages between $V_1$ and $V_2$ will produce an emission color given by the mixing of the colors of the two constituents according to the well-known laws of color combination. For example, if the first component emits red light and the second green, operation of the previously described cathode ray tube at suitable voltages between $V_1$ and $V_2$ will produce orange, yellow, chartreuse, and various shades of these colors.

Another embodiment of the invention, which is an extension of the same principles to more complex multi-component phosphors, has three or more components, each component having a distinct efficiency characteristic and distinct emission color. Thus, a composite mixture of phosphors consisting of red, blue, and green-emitting components produces a display containing essentially all the colors attainable by the conventional aperture mask tube now in common use. Since the composite phosphor herein described can be applied to the face of the cathode ray tube by the same techniques in common use in the manufacture of monochrome tubes, such as settling from a liquid suspension together with some binding medium, the complexity and expense of manufacture of tubes made in accordance with the teachings of the instant invention are substantially reduced.

The novel features of this invention are set forth with particularity in the appended claims. The invention itself, however, both as to organization and method of operation, together with further objects and advantages thereof, may be best understood by reference to the following description taken in connection with the accompanying drawings, in which:

Figure 4:
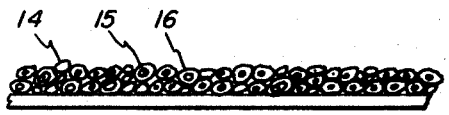
FIG. 4 illustrates a portion of a luminescent screen of a color display system in accord with an embodiment of the present invention.

By way of example, the present invention is described with reference to FIG. 1 wherein there is illustrated a phosphor particle 10 having the basic structure comprising a relatively non-luminescent core 11, a luminescent region 12 and a second non-luminescent region 13 adjacent the surfaces of the particle. The relative sizes of the three regions are only shown schematically and it should be understood that the mean radius of region 11 may assume any value between zero and the radius of the entire particle. The inner and outer radii of the luminescent region may similarly fall in the entire range of possible radii.

The various regions of the particle may be composed of any reasonably transparent solid state material, but of particular interest in the instant invention are those materials which demonstrate comparatively high luminous efficiency when excited by energized electrons and which emit light of the desired color. Examples of these materials are the alloys of zinc sulfide and cadmium sulfide, $Zn_xCd_{(1-x)}S$, where $x$ lies between zero and one, activated with copper, silver, or gold and coactivated with halogens, chlorine, bromine, and iodine or aluminum or any other common coactivator. These phosphors are capable of emitting blue, cyan, green, yellow, orange, or red light. In the non-luminescent core 11, either the activator or coactivator, or both, are absent while the non-luminescent outer layer 13 can be produced by adding one of the well-known iron group killers such as iron cobalt, or nickel.

Examples of red-emitting phosphors with greater luminous efficiency than the sulfides are the europium activated oxygen containing host materials such as yttrium vanadate, yttrium oxide, yttrium oxysulfide, and gadolinium oxide. As before, the relatively non-luminescent core region 11, consists of the host material, such as yttrium oxide, containing no activator, and the luminescent region 12, consists of yttrium oxide containing europium which has been grown, for example, from solution on the outside of the non-luminescent core.

Figure 1:
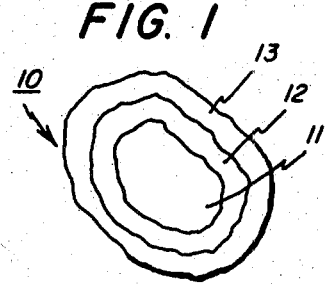
FIG. 1 illustrates schematically the cross section of a phosphor particle made in accordance with the teachings of the instant invention.
Figure 2:
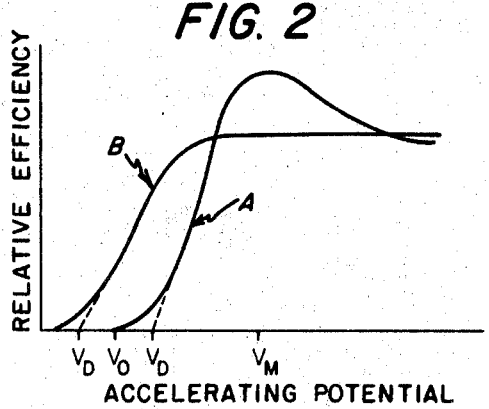
FIG. 2 illustrates the efficiency with which the energy of an electron is converted to luminescence by phosphor particles made in accord with the embodiment of FIG. 1.

The efficiency as a function of electron accelerating potential for phosphors having the basic structure of FIG. 1 is shown by Curve A of FIG. 2. The efficiency is defined as the luminous emission intensity divided by the electron beam power. When electrons are accelerated by a potential less than a threshold potential, $V_0$, they do not penetrate the non-luminescent outer layer 13 so the efficiency is exceedingly small. At higher potentials, some of the electrons reach the luminescent region and the efficiency rises. At still higher potentials some of the electrons penetrate through the luminescent region into the non-luminescent core resulting in loss of efficiency. Consequently, the efficiency passes through a maximum at the potential $V_m$ and then decreases. The optimum accelerating potential for using the phosphor is therefore $V_m$.

Figure 3:
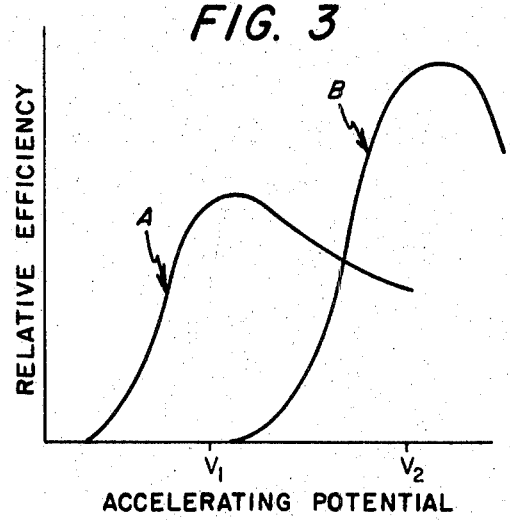
FIG. 3 illustrates the efficiencies of a mixture of two kinds of phosphors having different dimensions for various non-luminescent and luminescent regions.

The efficiency curves of two phosphors having different dimensions for the luminescent and non-luminescent regions are shown in FIG. 3. The lower operating potential, $V_1$, has been chosen to be near the potential which yields the maximum of Curve A and also less than the threshold value of Curve B. The upper operating potential, $V_2$, is near the maximum of Curve B while the value of Curve A is well below it maximum value. Consequently, operation of a cathode ray tube utilizing a composite two-component phosphor having efficiency characteristics such as those illustrated in FIG. 3, produces essentially only the emulsion of one of the two phosphors when operated at a potential $V_1$. Similarly, operation at the potential $V_2$ will yield predominately the emission of the component having the higher excitation threshold.

As illustrated in FIG. 4, the instant invention may be embodied in a three-component color system comprising red, blue, and green-emitting phosphors, 14, 15 and 16, respectively. The sizes or thicknesses of the various regions of the different phosphors, the relative concentrations of the different phosphors, and the operating potentials are chosen to provide a color display with desired brightness and color rendition. Obviously the composite phosphor layer may have an evaporated film of metal, such as aluminum, added to the side closest the electron gun to serve as an electrical conductor and an optical reflector.

Typical phosphors useful in practicing the instant invention are compositions of zinc-cadmium sulfide, $Zn_xCd_{(1-x)}S$, (where $x$ may vary from zero to one) with metal activators and halogen coactivators. To produce phosphors by the method of the instant invention, a desired portion of luminescent grade zinc-cadmium sulfide is heated in a flowing dry hydrogen sulfide stream for a sufficient period of time to drive out traces of chlorides which would otherwise provide undesirable luminescence in the final product. This may be done, for example, by heating the zinc-cadmium sulfide for one hour at temperatures of 400, 600, 800, and 1000° C. successively. The zinc-cadmium sulfide thus prepared, is mixed with antimony trioxide and heated in a vacuum or an inert atmosphere to promote crystal growth of 2 to 20 microns diameter size. This may be achieved by using the anitmony trioxide in proportioins of 0.1 to 5 percent and heating the mixture to promote the growth of crystallites. Typical times and temperatures for achieving crystal growth range between 900° C. to 1200° C. for 1 to 10 hours. The foregoing processing produces a non-luminescent well crystallized zinc sulfide.

To produce a luminescent region in the non-luminescent crystals, it is necessary to activate the crystals with silver. This may be achieved, for example, by adding a soluble silver salt to a water slurry of zinc-cadmium sulfide crystals. Specifically, silver nitrate may be used to give a concentration of silver of $10^{-5}$ to $10^{-3}$ gram-atoms of aluminum per mole of zinc-cadmium sulfide. The slurry is then dried and the coactivator diffused into the zinc cadmium sulfide. Where aluminum is used as the coactivator, diffusion may be achieved by heating in a hydrogen sulfide atmosphere for 5 minutes to 12 hours at 400° C. to 1200° C.

At this point in the process, the phosphor has a non-luminescent core and a luminescent outer region. To produce the phosphor as illustrated in FIG. 1, the following additional steps in the process are required. To a water slurry of zinc-cadmium sulfide containing an activator and a coactivator, a "killer impurity" such as iron, cobalt, or nickel is added. For example, a soluble cobalt salt such as cobalt sulfate could be used as a killer impurity. The zinc-cadmium sulfide powder is then washed and dried and subsequently heated in an inert gas atmosphere such as in an argon atmosphere for 5 minutes to 12 hours at 500° C. to 1200° C. The resultant phosphor has an inert core and a non-luminescent outer region separated by a luminescent region. By varying the times and temperatures set forth above, the parameters of the resultant phosphor can be altered in accord with the requirements of the particular application.

While the foregoing description pertains to zinc-cadmium sulfide phosphors, it is to be understood that other phosphors could likewise be used. For example, to produce a red-emitting phosphor consisting of europium activated yttrium oxide in accord with the instant invention, yttrium nitrate and europium nitrate can be combined with an alkali hydroxide such as sodium hydroxide or potassium hydroxide to promote crystal growth of a luminescent layer on top of a non-luminescent core. This may be achieved, for example, as follows: To a suspension of crystallized yttrium hydroxide in 4–10 molar sodium hydroxide, a solution of yttrium nitrate and europium nitrate is added such that the concentration of europium is 1 to 20 atom percent. The solution is stirred at a temperature from 20° C. to 100° C. from 1 to 16 hours to promote growth of yttrium-europium hydroxide on the yttrium hydroxide crystals. The resultant crystallites are then filtered and washed to remove any sodium hydroxide therefrom and subsequently are ignited in air to convert the yttrium hydroxide with an outer layer of yttrium-europium oxide. This may be achieved, for example, by igniting for 1 to 12 hours at 1000° C. to 1200° C. The resultant phosphor will have an inert core and an adjacent luminescent surface region. Such a phosphor will luminesce at extremely low voltages and will continue to luminesce with increased efficiency until the electrons penetrate into the non-luminescent core, at which time the efficiency will begin to decrease.

The method for making phosphor particles in accordance with the teachings of the instant invention can best be illustrated by reference to the following specific examples.

EXAMPLE 1

100 grams of luminescent grade zinc sulfide are heated in a flowing dry hydrogen sulfide stream for one hour at each of the following temperatures: 400° C., 600° C., 800° C., and 1000° C. This procedure removes small amounts of residual chloride impurities from the zinc sulfide and permits subsequent silver diffusion, as described below, without the formation of the luminescent material. The zinc sulfide thus prepared is mixed with one percent by weight of antimony trioxide and placed in a clear fused quartz bulb which is evacuated and sealed off. The mixture is heated at 1100° C. for two hours so as to promote crystal growth. The resultant particles of zinc sulfide are small crystals 2 to 20 microns in size and are non-luminescent. To a water slurry of this crystallized zinc sulfide is added a dilute solution of silver nitrate so as to give a silver concentration of $10^{-4}$ gram-atoms of silver per mole of zinc sulfide. The slurry is dried at 110° C. and the resultant dry powder is mixed by tumbling. It is then heated in a flowing, dry hydrogen sulfide stream for two hours at 1000° C. in order to diffuse the silver completely into the zinc sulfide particles and to remove antimony compounds by sublimation. The resultant zinc sulfide with the diffused silver is essentially non-luminescent. To a water slurry of this zinc sulfide containing silver is added a dilute solution of an aluminum salt such as the sulfate or nitrate so as to give an aluminum concentration of 10⁻⁴ gram-atoms of aluminum per mole of zinc sulfide. The slurry is dried and the powder is mixed by tumbling. This dry powder is again heated in a flowing dry hydrogen sulfide stream for a period of time and temperature selected so as to diffuse the aluminum into the zinc sulfide particles to a desired distance. For example, 10 grams of zinc sulfide powder with diffused silver and aluminum are heated at 900° C. for 10 minutes. The aluminum acts as a coactivator to produce a bright blue luminescence when present in the same region of a zinc sulfide particle with the silver activator. At this point, the particles comprise a non-luminescent core with an outer luminescent layer.

In order to produce the layered structure of the zinc sulfide particles as illustrated in FIG. 1, the following additional "deadening" or "killing" is required. To a rapidly stirred suspension of 10 grams of the zinc sulfide particles containing the diffused silver and partly diffused aluminum in 50 milliliters of water, is added 0.15 milliliter of 0.1 molar aqueous cobalt sulfate solution and 0.15 milliliter of 0.5 molar of aqueous ammonium sulfide solution. The zinc sulfide powder is then allowed to settle from the suspension and the supernatant liquid is decanted. The zinc sulfide powder is then washed with acetone, dried, and mixed by tumbling. The dry powder is then heated in a flowing dry argon atmosphere for 10 minutes at 700° C. The resultant phosphor will have the structure illustrated in FIG. 1.

The phosphor particles thus produced may be settled in a thin layer on a suitable substrate in a manner well known in the art of making cathode ray screens. Under cathode ray excitation conditions, the phosphor screen will have a characteristic luminescent efficiency as a function of electron accelerating potential as illustrated in FIG. 2 with the maximum efficiency occurring at approximately 11 kilovolts accelerating potential and a dead voltage occurring at 4 kilovolts accelerating potential. The dead voltage, $V_D$, is obtained by extrapolating the straight line region of the efficiency vs. voltage curve to the abscissa as shown in FIG. 2.

EXAMPLE 2

A modification of the procedure outlined in Example 1, produces phosphor particles having the structure illustrated in FIG. 1, but with the thickness of the outer non-luminescent layer 13, reduced to zero. This procedure is similar to that outlined in Example 1 except that the portion of the foregoing "deadening" procedure involving the addition of cobalt sulfate and ammonium sulfide and the subsequent heating in an argon stream is omitted. The phosphor particles produced by omitting the foregoing steps, exhibit a luminous efficiency under cathode ray excitation as a function of electron energy with a maximum occurring at approximately 8 kilovolts and a dead voltage of 1 kilovolt as illustrated by Curve A of FIG. 2.

Figure 5:
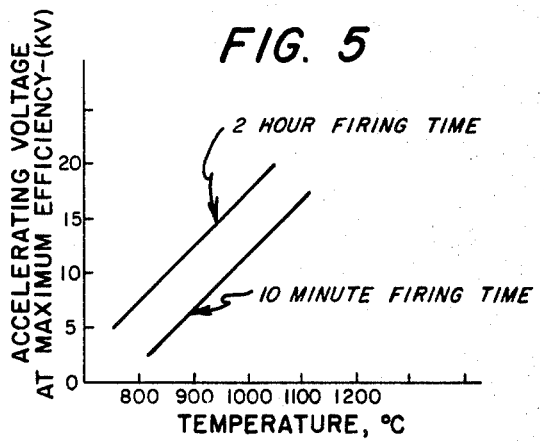
FIG. 5 illustrates typical diffusion times and temperatures of aluminum zinc-cadmium sulfide for producing phosphors with desired accelerating voltage characteristics for maximum efficiency.

Whereas Example 2 produced phosphors having a maximum luminous efficiency occurring at approximately 8 kilovolts, by varying the time and temperature of the heat treatment in the hydrogen sulfide stream of the zinc sulfide containing the diffused silver and aluminum, the maximum luminous efficiency may be made to occur at different electron energy levels. For example, if the heating temperature and time were changed from 900° C. for 10 minutes to 900° C. for 2 hours, the luminous efficiency will have a maximum at 12 kilovolts. As illustrated in FIG. 5 longer heating times produce phosphors having maximum luminous efficiencies at higher electron energy levels. Additionally, from FIG. 5, it can be seen that the heating may be performed either at low temperatures for long periods of time or at high temperatures for short periods of time. Similar results are obtained in either event; however, the longer heating times at the lower temperatures are advantageous when large samples are to be heated simultaneously since effects due to the non-uniform heating of the charge are minimized.

A further modification of the procedure outlined in Example 1 will produce particles of phosphor having a structure as illustrated in FIG. 1, but with the thickness of the inner non-luminescent core 11, reduced to zero. In the Example 3 below, a commercial $Zn_xCd_{(1-x)}S$ phosphor activated with silver and coactivated with aluminum or the halogens bromine, or iodine and of such a composition so as to luminesce under cathode ray excitation with any desired color between blue and deep red is used as a starting material. The preparation of such phosphors is well known in the art.

EXAMPLE 3

100 grams of a commercial zinc-cadmium sulfide phosphor is "deadened" as described in the latter part of Example 1, with proportionately increased amounts of cobalt sulfate and ammonium sulfide. Portions of the dried and mixed phosphor are heated in 20 gram lots in a flowing argon stream at a temperature and for a period of time selected so as to produce a phosphor having the desired "dead voltage" as determined by the thickness of the outer non-luminescent layer 13. Such a phosphor will have a luminous efficiency under cathode ray excitation as a function of the electron energy as shown by Curve B of FIG. 2.

Figure 6:
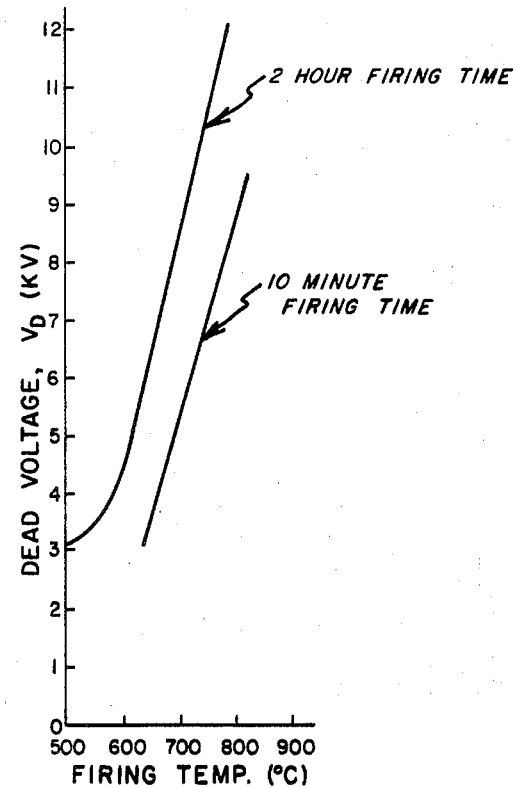
FIG. 6 illustrates typical diffusion times and temperatures of cobalt in zinc-cadmium sulfide for producing phosphors with various dead voltages.

The dead voltage, which is related to the thickness of layer 13, can be used as one indication of the utility of the phosphor. By varying the heating time and temperature of the phosphor, the value of the dead voltage can be controlled. The relationship between the dead voltage, heating temperature, and the heating time is illustrated in FIG. 6. As illustrated therein, a decrease in temperature of 75° C. is equivalent to an increase in heating time from 10 minutes to 2 hours.

EXAMPLE 4

A procedure for producing a red-emitting phosphor having the structure illustrated in FIG. 1, but with the thickness of the outer non-luminescent layer reduced to zero is as follows: 10 milliliters of an aqueous solution of yttrium nitrate containing 0.079 grams of yttrium per milliliter is added to 80 milliliters of an aqueous 10 molar sodium hydroxide solution. The suspended precipitate of yttrium hydroxide is stirred rapidly and heated at 100° C. for one hour. This procedure produces needle-like crystals of yttrium hydroxide 2 to 6 microns in length and about 2 microns in diameter. The particles of yttrium hydroxide first formed upon the addition of the yttrium solution to the sodium hydroxide solution are extremely small with a large surface-to-volume ratio and have a higher solubility in the sodium hydroxide solution than the larger crystals of yttrium hydroxide. Recrystallization will therefore occur so as to reduce the surface-to-volume ratio in accord with the process frequently referred to in the technical literature as the aging, recrystallization, or ripening of a fine precipitate. After 1 hour of heating at 100° C. and agitation, 10 milliliters of a yttrium nitrate solution containing 0.079 grams of yttrium per milliliter is mixed with 1 milliliter of an aqueous europium nitrate solution, containing 0.054 grams europium per milliliter; 4 milliliters of the mixed solution of yttrium nitrate and europium nitrate are added to the suspension of the crystallized yttrium hydroxide in the 10 molar sodium hydroxide. The suspension is again stirred rapidly for 16 hours without heating. The fine precipitate of the mixed europium-yttrium hydroxide will recrystallize and grow primarily on the surface of the already formed crystallites of the yttrium hydroxide by the same process described above. The precipitate is then separated from the sodium hydroxide solution by filtration and thoroughly washed until free of the sodium hydroxide. It is finally ignited in air for two hours at 1050° C. This heating converts the hydroxides into corresponding oxides without change in the external shape of the individual particles. The resultant phosphor, yttrium oxide activated by europium, is excited by cathode rays to emit red light as is well known in the art. However, because of the structure resulting from the method of preparation described, the luminous efficiency under cathode ray excitation as a function of the electron energy will have characteristics as illustrated in Curve A of FIG. 2 with a maximum in the efficiency occurring at approximately 6 kilovolts, and a dead voltage of less than 1 kilovolt.

In the examples 1–3, procedures were illustrated for preparing silver activated zinc-cadmium sulfide phosphors having structures as illustrated in FIG. 1 with the thickness of the regions 11 and 13 ranging from zero to that of the individual particle itself. Although specific examples are given, it is obvious from the methods described that controlled changes in the time and temperature of the aluminum and cobalt diffusion makes it possible to prepare phosphor particles with any desired thickness for the regions 11 and 13. In Example 4, a process is described for preparing europium activated yttrium oxide phosphor particles having the basic structure as illustrated in FIG. 1 with the thickness of region 13 equal to zero. By varying the weight of the second precipitate relative to the first precipitate, the thickness of region 12 can be controlled. By varying the thicknesses of the three regions, the accelerating potential at which the maximum in luminescence efficiency occurs and the dead voltage can be controlled. It is thus possible to select parameters for the phosphors which are best suited for a particular color display application and prepare the phosphors accordingly.

EXAMPLE 5

100 grams of a green-emitting silver activated zinc-cadmium sulfide phosphor is heated as described in Example 3. The heating temperature and time for the cobalt diffusion are 760° C. for 10 minutes. This produces a green-emitting phosphor whose dead voltage under cathode ray excitation is approximately 6 kilovolts as illustrated in Curve B of FIG. 2. The phosphor thus prepared is then "silicized" according to the well-known art used in preparing phosphors for settling on cathode ray tubes. This silicizing process assures adequate dispersion of the phosphor particles during settling of the phosphor on the substrate. One such process consists of stirring the phosphor in a solution of potassium silicate and magnesium nitrate. The solutions of potassium silicate and magnesium nitrate are prepared, for example, in the following proportions. For each 100 grams of phosphor to be coated, 1.1 milliliters of DuPont K–200 potassium silicate solution and 20 milliliters of a 3.8 percent by weight of magnesium nitrate solution are added to 200 milliliters of water. The phosphor to be treated is added to the solution and stirred for 30 minutes. The suspension is allowed to settle and the liquid poured off. The phosphor is then washed in distilled water and sieved, for example, through a 200 mesh screen. 100 grams of this silicized green phosphor are then admixed with 25 grams of a red-emitting phosphor such as the europium activated yttrium vanadate. A portion of the mixed phosphors are then settled on a suitable substrate according to one of the well-known methods for making monochrome television screens by settling. The resultant screen will luminesce red under cathode ray excitation when excited by approximately 4 kilovolt electrons and will luminesce green when excited by approximately 14 kilovolt electrons. At 5 kilovolts, the color is orange, at 6 kilovolts the color is yellow, at 7 kilovolts the color yellowish-white, at 8 and 9 kilovolts the color is yellowish-green. On the C.I.E. color mixture diagram, the $x$ and $y$ coordinates of this composite phosphor at the various accelerating voltages are shown in the following table:

| Accelerating voltage (in kilovolts): | $x$ | $y$ |
| --- | --- | --- |
| 4 | 0.650 | 0.350 |
| 6 | 0.435 | 0.505 |
| 8 | 0.340 | 0.560 |
| 10 | 0.330 | 0.580 |
| 12 | 0.325 | 0.585 |
| 14 | 0.315 | 0.590 |

Since the color coordinates of the red phosphor by itself are $x=0.650$, $y=0.350$, and that the green phosphor by itself has coordinates $x=0.310$ and $y=0.605$, it can be seen from the above table that a 4 kilovolts and 14 kilovolts, respectively, the colors of the mixed phosphors are close to the individual phosphor components. This illustrates that essentially no desaturation of the component colors has occurred.

Whereas the cathode ray tube described above is a two-component screen and the accessible colors are limited to a straight line connecting the color coordinates of the component phosphors in the C.I.E. diagram, a three-color component screen would make accessible colors within a color triangle connecting the color coordinates of each of the three component phosphors. Such a three-color component screen can be constructed by using the above-mentioned green-emitting phosphor having a non-luminescent region 13 and a luminescent region 12 as shown in FIG. 1, a blue-emitting phosphor having two non-luminescent regions 11 and 13 and a luminescent region 12, also shown in FIG. 1, and a red-emitting phosphor such as europium activated yttrium vanadate. Depending on the voltage position of the maximum in the efficiency vs. voltage curve of the blue-emitting phosphor, the dead voltage values of the green and blue-emitting phosphors and the relative efficiencies of the three phosphors, a suitable mixture is made so that the colors of the emitted light under three different accelerating voltages are close to green, red, and blue.

Improved saturation of the colors at the high voltage levels can be obtained by using a red-emitting phosphor such as europium activated yttrium oride prepared as described above in Example 4. The three-component cathode ray tube screen is operated at three fixed accelerating voltages and all the accessible colors within the color mixture triangle of the C.I.E. diagram are obtained by modulating the electron beam current at each of the three voltages.

While only certain preferred embodiments have been shown by way of illustration, many modifications and changes will occur to those skilled in the art.

What we claim as new and desire to secure by Letters Patent of the United States is:

1. A method for preparing a phosphor particle having luminescent and non-luminescent regions comprising the steps of:
   heating a solution of yttrium nitrate and an alkali hydroxide to produce a suspension of crystals of yttrium hydroxide;
   adding a solution comprising yttrium nitrate and europium nitrate to the suspension of yttrium hydroxide crystals, said europium nitrate lying within the range of 1 to 20 molar percent;
   heating the solution to produce crystals of yttrium hydroxide having a thin outer region of europium-yttrium hydroxide;
   removing from solution and igniting said crystals of yttrium hydroxide having a thin outer region of europium-yttrium hydroxide to produce europium activated yttrium oxide phosphor particles having a non-luminescent core and a luminescent outer region.

2. The method of Claim 1 wherein the ignition is performed at a temperature of 1000° C. to 1200° C. for 1 to 12 hours.

3. The method of Claim 1 wherein the heating to produce yttrium hydroxide crystals having a thin outer region of europium-yttrium hydroxide includes heating in 4 to 10 molar percent sodium hydroxide solution at a temperature of 20° C. to 100° C. for approximately 1 to 16 hours.

4. The method of Claim 1 wherein said alkali hydroxide is selected from the group consisting of sodium hydroxide and potassium hydroxide.

References Cited

UNITED STATES PATENTS

| | | | |
|---|---|---|---|
| 3,582,493 | 6/1971 | Haynes et al. | 252—301.4 R |
| 3,544,478 | 12/1970 | Graff | 252—301.4 R |
| 3,740,250 | 6/1973 | Hammond et al. | 117—100 B |
| 3,619,265 | 11/1971 | Hammond et al. | 117—33.5 R |

FOREIGN PATENTS

| | | | |
|---|---|---|---|
| 779,860 | 3/1968 | Canada | 252—301.4 |

WILLIAM D. MARTIN, Primary Examiner

D. C. KONOPACKI, Assistant Examiner

U.S. Cl. X.R.

117—33.5 R, 33.5 C, 33.5 CM; 252—301.4 F